US012800556B2

(12) United States Patent
Hill et al.

(10) Patent No.: US 12,800,556 B2
(45) Date of Patent: Nov. 17, 2026

(54) BIOCOMPATIBLE FITTING ASSEMBLY AND FLUIDIC CONNECTION SYSTEM

(71) Applicant: IDEX HEALTH & SCIENCE LLC, Oak Harbor, WA (US)

(72) Inventors: Gabriel Hill, Oak Harbor, WA (US); Seth Kettlewell, Oak Harbor, WA (US); Mark Hahn, Oak Harbor, WA (US)

(73) Assignee: IDEX HEALTH & SCIENCE LLC, Oak Harbor, WA (US)

( * ) Notice: Subject to any disclaimer, the term of this patent is extended or adjusted under 35 U.S.C. 154(b) by 503 days.

(21) Appl. No.: 18/447,095

(22) Filed: Aug. 9, 2023

(65) Prior Publication Data

US 2025/0052729 A1 Feb. 13, 2025

(51) Int. Cl.

| | |
|---|---|
| ***G01N 30/60*** | (2006.01) |
| *F16L 19/065* | (2006.01) |
| *F16L 19/07* | (2006.01) |
| *F16L 21/08* | (2006.01) |
| *G01N 30/02* | (2006.01) |

(52) U.S. Cl.
CPC ........ *G01N 30/6026* (2013.01); *F16L 19/065* (2013.01); *F16L 19/07* (2013.01); *F16L 21/08* (2013.01); *G01N 2030/027* (2013.01)

(58) Field of Classification Search
CPC .......... G01N 30/6026; G01N 2030/027; F16L 19/065; F16L 19/07; F16L 21/08
See application file for complete search history.

(56) References Cited

U.S. PATENT DOCUMENTS

| | | | |
|---|---|---|---|
| 4,165,893 | A | 8/1979 | Fields |
| 4,619,473 | A | 10/1986 | Someya |
| 4,690,437 | A | 9/1987 | Anderson, Jr. |
| 4,968,421 | A | 11/1990 | Spacek et al. |
| 5,033,435 | A | 7/1991 | Ostarello et al. |
| 5,074,599 | A | 12/1991 | Wirbel et al. |
| 5,472,598 | A | 12/1995 | Schick |
| 5,525,303 | A | 6/1996 | Ford et al. |
| 5,540,464 | A | 7/1996 | Picha |
| 5,614,154 | A | 3/1997 | Glatz et al. |

(Continued)

FOREIGN PATENT DOCUMENTS

| | | | |
|---|---|---|---|
| DE | 102009022368 | B3 | 11/2010 |
| EP | 2564104 | A2 | 3/2013 |

(Continued)

OTHER PUBLICATIONS

Next Generation UHPLC Connection Technology, MarvelX-Brochure 062920, Intelligent Solutions for Life, 4 pages, 2020.

*Primary Examiner* — Michael R Reid
*Assistant Examiner* — Christopher D Ballman
(74) *Attorney, Agent, or Firm* — Kilpatrick Townsend & Stockton LLP

(57) ABSTRACT

A fluidic connection system may include a threaded fastener and a fitting assembly. The threaded fastener may be a universal threaded fastener that may be used with various tubings having different outer diameters. The fitting assembly may include a locking ring and a ferrule sized and shaped to fit within a borehole of the locking ring. When the fluidic connection system is assembled an end of the locking ring and an end of the ferrule may project beyond an end of the fitting assembly.

19 Claims, 15 Drawing Sheets

(56) References Cited

U.S. PATENT DOCUMENTS

| | | | | |
|---|---|---|---|---|
| 5,651,885 | A | 7/1997 | Schick | |
| 5,730,943 | A | 3/1998 | Ford et al. | |
| 6,056,331 | A | 5/2000 | Benett et al. | |
| 6,095,572 | A | 8/2000 | Ford et al. | |
| 6,273,478 | B1 | 8/2001 | Benett et al. | |
| 6,494,500 | B1 | 12/2002 | Todosiev et al. | |
| 6,926,313 | B1 | 8/2005 | Renz | |
| 7,289,623 | B2 | 10/2007 | Lurie | |
| 7,311,502 | B2 | 12/2007 | Gerhardt et al. | |
| 8,696,038 | B2 | 4/2014 | Nienhuis | |
| 8,696,902 | B2 * | 4/2014 | Ford | G01N 30/6039 73/61.53 |
| 8,740,261 | B2 * | 6/2014 | Ford | F16L 19/065 285/353 |
| 9,091,693 | B2 | 7/2015 | Hochgraeber et al. | |
| 9,310,008 | B2 * | 4/2016 | Beemer | F16L 19/0237 |
| 9,322,811 | B2 | 4/2016 | McAdams et al. | |
| 9,334,989 | B2 | 5/2016 | Jencks et al. | |
| 9,448,210 | B2 | 9/2016 | Hochgraeber et al. | |
| 10,067,102 | B2 | 9/2018 | Hochgraeber et al. | |
| 10,444,205 | B2 | 10/2019 | Hochgraeber et al. | |
| 10,655,761 | B2 | 5/2020 | Graham et al. | |
| 11,181,189 | B2 * | 11/2021 | Ford | F16B 7/149 |
| 11,187,360 | B2 * | 11/2021 | Beemer | F16L 33/227 |
| 11,719,673 | B2 * | 8/2023 | Toji | G01N 21/0303 73/61.56 |
| 2005/0269264 | A1 | 12/2005 | Fermier et al. | |
| 2006/0113794 | A1 | 6/2006 | Plant et al. | |
| 2007/0283746 | A1 | 12/2007 | Gerhardt et al. | |
| 2008/0237112 | A1 | 10/2008 | Ford et al. | |
| 2011/0025047 | A1 * | 2/2011 | Zelechonok | F16L 37/138 285/212 |
| 2012/0024411 | A1 | 2/2012 | Hahn et al. | |
| 2012/0061955 | A1 | 3/2012 | Hochgraeber et al. | |
| 2013/0043677 | A1 | 2/2013 | Gibson | |
| 2014/0130580 | A1 * | 5/2014 | Mcadams | B01L 3/563 285/386 |
| 2015/0308989 | A1 | 10/2015 | Hochgraeber et al. | |
| 2016/0116088 | A1 | 4/2016 | Graham et al. | |
| 2016/0223108 | A1 | 8/2016 | Jencks et al. | |
| 2020/0292108 | A1 | 9/2020 | Graham et al. | |

FOREIGN PATENT DOCUMENTS

| | | | |
|---|---|---|---|
| EP | 2516912 | B1 | 4/2015 |
| WO | 9424466 | A2 | 10/1994 |
| WO | 2005084337 | A2 | 9/2005 |
| WO | 2006091952 | A1 | 8/2006 |
| WO | 2009088663 | A1 | 7/2009 |
| WO | 2012177403 | A1 | 12/2012 |
| WO | 2014099777 | A1 | 6/2014 |

* cited by examiner

BIOCOMPATIBLE FITTING ASSEMBLY AND FLUIDIC CONNECTION SYSTEM

FIELD OF THE INVENTION

The present disclosure relates generally to fitting assemblies and fluidic connection systems, such as those used in connecting components of analytical instrument systems, and more specifically, to biocompatible fitting assemblies used in connection with analytical instruments, biological processes and fluids, diagnostics, and the life sciences.

BACKGROUND OF THE INVENTION

A wide variety of instruments and systems are available to process biological samples, assist in diagnoses of medical conditions, manipulate DNA, and the like. This disclosure relates to new and improved fitting assemblies for use in such applications as the above, as well as flow cytometry, proteomics, and analytical and scientific instruments. Although not limited to liquid chromatography (LC) applications, LC is used in this disclosure as an example of a type of analytical system used in connection with the analyses of biological samples in which the new and improved fitting assembly described below may be used. Although the following discussion focuses on liquid chromatography, it is to be noted that much if not all of what is said with respect to LC systems also has application to gas chromatography, ion chromatography, and other types of analytical instrument (AI) systems and methods. Other such AI systems and methods may include, for example, lab on a chip, printing, sensors, micro chromatography, biochemical detection, mass spectrometry, biological sensing, drug discovery, drug delivery, molecular separation, proteomics, fuel cells, optics and opto-fluidics, and research tools.

LC is a well-known technique for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase.

In a conventional LC system, the sample and mobile phase pass through one or more filters and often a guard column before coming to the column. A typical column usually consists of a piece of steel tubing which has been packed with a "packing" material. The "packing" consists of the particulate material "packed" inside the column. It usually consists of silica- or polymer-based particles, which are often chemically bonded with a chemical functionality. The packing material is also known as the stationary phase. One of the fundamental principles of separation is the mobile phase continuously passing through the stationary phase. When the sample is carried through the column (along with the mobile phase), the various components (solutes) in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

Once the sample (with its components now separated) leaves the column, it flows with the mobile phase past a detector. The detector detects the presence of specific molecules or compounds. Two general types of detectors are used in LC applications. One type measures a change in some overall physical property of the mobile phase and the sample (such as their refractive index). The other type measures only some property of the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample.

In addition to the above components, a LC system will often include filters, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column.

In practice, various components in an LC system may be connected by an operator to perform a given task. For example, an operator will select an appropriate mobile phase and column, then connect a supply of the selected mobile phase and a selected column to the LC system before operation. Each connection must be able to withstand the typical operating pressures of the system. If the connection is too weak, it may leak. Because the types of solvents that are sometimes used as the mobile phase are often toxic and because it is often expensive to obtain and/or prepare many samples for use, any such connection failure is a serious concern.

Given concerns about the need for leak-free connections, conventional connections have been made with stainless steel tubing and stainless-steel end fittings. More recently, however, it has been realized that the use of stainless-steel components in a LC system have potential drawbacks in situations involving biological samples or biological processes. For example, the components in a sample may attach themselves to the wall of stainless-steel tubing. This presents problems because the detector's measurements (and thus the results, such as a chromatogram in an LC system) of a given sample may not accurately reflect the sample if some of the sample's components or ions remain in the tubing, and do not pass the detector. Perhaps of even greater concern, however, is the fact that ions from the stainless-steel tubing may detach from the tubing and flow past the detector, thus leading to potentially erroneous results. Additionally, ions can easily bind to biological compounds of interest. Hence, there is a need for "biocompatible" connections through the use of a material that is chemically inert with respect to such "biological" samples and biological processes.

In many applications using selector/injector valves to direct fluid flows, and in particular in liquid and gas chromatography, the volume of fluids is small. This is particularly true when liquid or gas chromatography is being used as an analytical method as opposed to a preparative method.

Such methods often use capillary columns and are generally referred to as capillary chromatography. In capillary chromatography, both gas phase and liquid phase, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques, for example, historically often involved samples of about one microliter to about 100 milliliters in volume. Thus, the micro-fluidic techniques described herein involve volumes one or more orders of magnitude smaller in size than traditional LC techniques. Micro-fluidic techniques can also be expressed as those involving fluid flow rates of about 0.5 ml/minute or less.

As noted, liquid chromatography (as well as other analytical) typically includes several components. For example, such a system may include a pump; an injection valve or autosampler for injecting the analyte; a precolumn filter to remove particulate matter in the analyte solution that might clog the column; a packed bed to retain irreversibly adsorbed chemical material; the column itself; and a detector that analyzes the carrier fluid as it leaves the column.

All of these various components and lengths of tubing are typically interconnected by threaded fittings. Fittings for connecting various LC and other types of systems' components and lengths of tubing are disclosed in prior patents, for example, U.S. Pat. Nos. 5,525,303; 5,730,943; and 6,095,572, the disclosures of which are herein all incorporated by reference as if fully set forth herein. Often, a first internally threaded fitting seals to a first component with a ferrule or similar sealing device. The first fitting is threadedly connected through multiple turns by hand or by use of a wrench or wrenches to a second fitting having a corresponding external fitting, which is in turn sealed to a second component by a ferrule or other seal. Disconnecting these fittings for component replacement, maintenance, or reconfiguration often requires the use of a wrench or wrenches to unthread the fittings. Although a wrench or wrenches may be used, other tools such as pliers or other gripping and holding tools are sometimes used. It will be understood that, as used herein, the term "LC system" is intended in its broad sense to include all apparatus and components in a system used in connection with liquid chromatography, whether made of only a few simple components or made of numerous, sophisticated components which are computer controlled or the like. It should be noted that an LC system is one type of an analytical instrument (AI) system. Although the discussion herein focuses on liquid chromatography, much of what is said also applies to other types of AI systems and methods and biological processes and the systems for such processes.

One example of a flat-bottomed or face-sealing connection assembly is provided by U.S. Pat. No. 8,696,038, titled "Flat Bottom Fitting Assembly" and issued on Apr. 15, 2014 to Nienhuis. Nienhuis teaches a type of flat bottom assembly which includes a flat-sided ferrule, and wherein the assembly including the ferrule and the tube can be pressed against a flat bottom port. Another example of a flat-bottomed or face-sealing connection assembly is provided by published U.S. Patent Application No. 2012/0024411, titled "Biocompatible Tubing for Liquid Chromatography Systems," which was published on Feb. 2, 2012 and was filed on behalf of Hahn et al. The Hahn et al. published patent application describes tubing having an inner layer and an outer layer, and in which the inner layer can be biocompatible material such as polyetheretherketone (PEEK) and the outer layer may be a different material, and in which an end of the tubing may be flared or otherwise adapted to have a larger outer diameter than other portions of the tubing.

One issue with conventional ferrules used with coned ports is that the torque required to deform/deflect is typically above finger tight levels. It is desirable to remove tools from the lab by making them unnecessary for making and breaking fluidic connections and it is advantageous to have fittings that can be connected simply with the fingers rather than tools.

U.S. Pat. Nos. 5,525,303, 5,730,943, 6,056,0331, 6,095,572, 6,056,331, 7,311,502, 8,696,038, European Patent No. EP2564104, and published U.S. Patent Application Nos. 2005/0269264, 2007/0283746, 2012/0024411, 2012/0061955, and 2013/0043677 are hereby incorporated by reference as if fully set forth herein.

SUMMARY OF THE INVENTION

It is therefore an object of the present disclosure to provide a fluidic connection system including a threaded fastener and a fitting assembly that reduces required installation force. It is a further object of the present disclosure to provide a fluidic connection system, wherein the axial force necessary to create an effective seal can be generated manually, with minimal torque and without the use of tools. It is a further object of the present disclosure to provide a fluidic connection system that can be quickly and easily connected and disconnected with various tubes and ports without damaging the assembly. Finally, the fluidic connection system may be biocompatible (e.g. fully metal free). In some embodiments, one or more of the components of the fitting assembly (e.g. the ferrule and/or the locking body) may be symmetric such that components may be assembled in multiple orientations (e.g. facing either direction) for reducing errors and assembly time. The components of the fitting assembly may also interface with one another so as to reduce material creep while providing a biocompatible assembly. The threaded fastener of the system may be a universal threaded fastener that may be utilized across multiple tubing sizes while also providing proper centering and ferrule height to ensure ease of installation across a variety of needs.

In one embodiment of the present disclosure, a fluidic connection system includes a fitting assembly comprising a biocompatible ferrule system having a ferrule and a locking ring. The locking ring may have a larger opening on at least one end (defined by the inner diameter of the locking ring) such that the ferrule may be pressed into the opening of the locking ring. In some aspects, the inner diameter of the locking ring may be consistent in the central area which may allow for the locking ring to be oriented in either direction all while maintaining the same clamping effect, thereby reducing errors and assembly time. In addition, the ferrule may be designed to be symmetric so that it may be assembled in either direction with the same result, further reducing errors and assembly time. In some aspects, the locking ring may be formed from a polymer, for example but not limited to a biocompatible material, including a biocompatible polymer such as a polyetheretherketone (PEEK) polymer. In some aspects, the locking ring may be formed from a reinforced PEEK polymer for increasing stiffness of the locking ring. The ferrule may also be formed of a biocompatible material, such as a biocompatible polymer, for example but not limited to a PEEK polymer. In some aspects, the ferrule is formed from an unfilled PEEK polymer. The construction of the ferrule and the locking body minimizes the ability to damage the ferrule due to overtorque and also minimizes stress-relaxation and creep, which prevents the need for multiple tightening cycles. The ferrule body may be produced via injection molding or by extruding the material into a tube and cutting the tube to the final desired length, though other suitable manufacturing means may be used. In some aspects, one or more of the ferrule and the locking ring comprises at least one of polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (PCTFE), or filled materials. For example, one or more of the above materials may comprise carbon-fiber (e.g., carbon-fiber reinforced PEEK), and/or polymeric material, or a combination of some or all of the foregoing. Polymeric materials may include composite or braided materials, such as polymeric materials that include or are braided with fibers such as carbon fibers, steel fibers, basalt fibers, or the like. The carbon, carbon fibers, steel fibers, or other fibers (e.g., basalt fibers), may comprise anywhere from 5%, 10%, 20%, 30%, 40%, or 50% by weight or by volume of the reinforcing material. The fibers may comprise materials that are the same as, or are different from, the polymer in which the fibers are included. The threaded fastener of the fluidic connection system may be a universal threaded fitting that delivers optimal fitting engagement with the fitting assembly across a variety of port configurations (e.g. shallow ports, machined threaded ports, and/or different sized tubings).

In some aspects, the fluidic connection system is assembled by sliding a threaded fastener and then a locking ring onto the desired tubing and then pressing a ferrule onto the end of the tubing. The threaded fastener includes a feature to help locate and center the fitting assembly and tubing so that it is concentric with the mating threaded fluidic port through hole. In some embodiments, for example in a fitting assembly for use with a tubing having an outer diameter of 1/16", the locking ring and ferrule body are centered via their mating inside an inner pocket on the threaded fastener. In other embodiments, for example in a fitting assembly for use with a tubing having an outer diameter of 1/8", the centering may be provided by mating a female tapered feature on the threaded fastener and a male tapered feature on the locking ring. The resulting fitting assembly may provide an optimal amount of the ferrule extending past the end of the threaded fastener such that the threaded fastener's threads do not bottom out in the port while providing for proper thread engagement in shallow fluidic ports. The fitting assembly may then be loaded into a mating port or pressing mechanism to press the locking ring onto the ferrule such that the ends of the locking ring and the ferrule end up flush or nearly flush with the end of the inner tubing and solidly pressed together for creating a seal.

Each of the fitting assembly, tubing assembly, and analytical instrument system of the present disclosure are adapted to provide at least one sealing connection for a fluidic connection in which the fluid has a pressure of between 0 psi and 500 psi, between 50 psi and 400 psi, 0 psi and 200 psi, and/or between 100 psi and 250 psi. Such a sealing connection can be made by a user without the use of tools and using only about less than 2 inch pound of installation torque or less, without the use of tool. This is significantly less than prior designs which require 2 or more inch pounds and typically require a tool to be used in order to achieve full performance. Each of the fitting assemblies of the present disclosure are able to withstand torque levels in excess of what they are normally subjected to during installation, for example in standard ports the disclosed fitting assemblies are capable of withstanding up to 5 inch pounds of torque with no obvious signs of failure and no reduction in pressure capability after the test. The design of the fitting assemblies of the present disclosure are such that sealing performance is largely independent of most torque values applied by hand. Thus, within a wide range of torque applications the performance of the seals of the disclosed fitting assemblies will be relatively constant.

These and numerous other features, objects and advantages of the present disclosure will become readily apparent to those skilled in the art upon a reading of the detailed description, claims and the drawings.

DETAILED DESCRIPTION

As noted above, there is a wide variety of instruments and systems available to analyze, process, and otherwise use biological samples, assist in diagnoses of medical conditions, manipulate DNA, and the like. This disclosure relates to new and improved fitting assemblies for use in such applications. The improved fitting assemblies disclosed herein may be used in systems and applications for flow cytometry, gene sequencing, proteomics, systems and processes for manufacturing and/or analyzing biologics and biosimilars, and the like. In addition, the improved fitting assemblies described and shown herein may be used in connection with systems and processes for health applications, including clinical and diagnostic instruments and systems, for example but not limited to fluid drip-feeding devices, in vitro diagnostics, in bioprocessing and pharmaceutical systems, clinical chemistry, immunoassay, hematology, molecular diagnostics, Clustered Regularly Interspaced Short Palindromic Repeats ("CRISPR"), sample preparation, spatial biology, Polymerase Chain Reaction ("PCR") and HbA1c testing and processing, and so forth. Although not limited to liquid chromatography (LC) applications, LC is used in this disclosure as an example of a type of analytical instrument system that may be used in connection with the analyses of biological samples in which the new and improved fitting assembly described below may be used. Although the following discussion focuses on liquid chromatography, it should be understood that much of what is said with respect to LC systems also has application to gas chromatography, ion chromatography, and other types of analytical instrument (AI) systems and methods, as well as the systems and processes noted above. Other such AI systems and other process and applications in which the fitting assemblies of the present disclosure may be used may include, for example, lab on a chip, printing, sensors, micro chromatography, biochemical detection, mass spectrometry, biological sensing, drug discovery, drug delivery, molecular separation, proteomics, flow cells, fuel cells, optics and opto-fluidics, and research tools.

Figure 1:
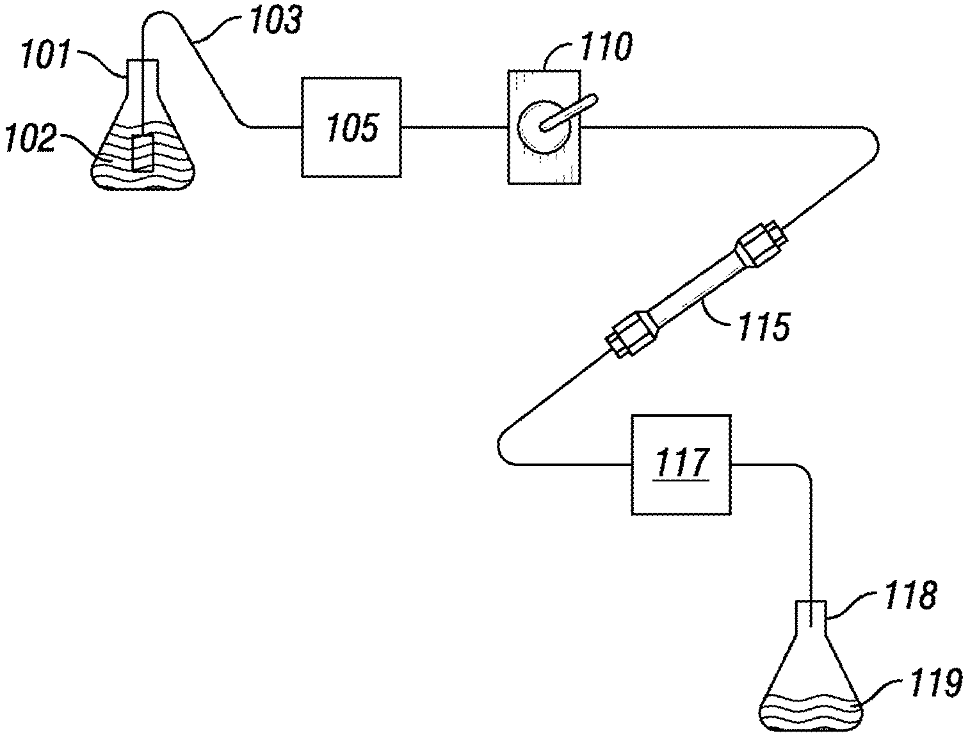
FIG. 1 (Prior Art)
FIG. 1 is a block diagram of a conventional liquid chromatography system.

In FIG. 1, a block diagram of the essential elements of a conventional liquid chromatography (LC) system is provided. A reservoir 101 contains a solvent or mobile phase 102. Tubing 103 connects the mobile phase 102 in the reservoir 101 to a pump 105. The pump 105 is connected to a sample injection valve 110 which, in turn, is connected via tubing to a first end of a guard column (not shown). The second end of the guard column (not shown) is in turn connected to the first end of a primary column 115. The second end of the primary column 115 is then connected via tubing to a detector 117. After passing through the detector 117, the mobile phase 102 and the sample injected via injection valve 110 are expended into a second reservoir 118, which contains the chemical waste 119. As noted above, the sample injection valve 110 is used to inject a sample of a material to be studied into the LC system. The mobile phase 102 flows through the tubing 103 which is used to connect the various elements of the LC system together.

When the sample is injected via sample injection valve 110 in the LC system, the sample is carried by the mobile phase through the tubing into the column 115. As is well-known in the art, the column 115 contains a packing material which acts to separate the constituent elements of the sample. After exiting the column 115, the sample (as separated via the column 115) then is carried to and enters a detector 117, which detects the presence or absence of various chemicals. The information obtained by the detector 117 can then be stored and used by an operator of the LC system to determine the constituent elements of the sample injected into the LC system. Those skilled in the art will appreciate that FIG. 1 and the foregoing discussion provide only a brief overview of a simplistic LC system that is conventional and well-known in the art, as is shown and described in U.S. Pat. No. 5,472,598, issued Dec. 5, 1995 to Schick, which is hereby incorporated by reference as if fully set forth herein. Those skilled in the art will also appreciate that while the discussion herein focuses on a LC system, other analytical systems can be used in connection with various embodiments of the invention, such as a mass spectrometry, microflow chromatography, nanoflow chromatography, nano-scale liquid chromatography, capillary electrophoresis, or reverse-phase gradient chromatography system.

Preferably, for a fluidic system to be biocompatible and metal free, the various components (except where otherwise noted) that may come into contact with the effluent or sample to be analyzed are made of the synthetic polymer polyetheretherketone, which is commercially available under the trademark "PEEK" from Victrex. The polymer PEEK has the advantage of providing a high degree of chemical inertness and therefore biocompatibility; it is chemically inert to most of the common solvents used in fluidic applications, such as acetone, acetonitrile, and methanol (to name a few). PEEK also can be machined by standard machining techniques to provide smooth surfaces. It should be noted that other polymers may be desirable in certain applications. In some aspects, one or more components of a biocompatible fluidic system may comprise at least one of polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), or polychlorotrifluoroethylene (PCTFE). In any one or more of the foregoing polymers, additional reinforcing fillers or materials may be provided. For example, one or more of the above materials may comprise carbon-fiber (e.g., carbon-fiber reinforced PEEK), and/or polymeric material, or a combination of some or all of the foregoing. Polymeric materials may include composite or braided materials, such as polymeric materials that include or are braided with fibers such as carbon fibers, steel fibers, basalt fibers, or the like. The carbon, carbon fibers, steel fibers, or other fibers (e.g., basalt fibers), may comprise anywhere from 5%, 10%, 20%, 30%, 40%, or 50% by weight or by volume of the reinforcing material. The fibers may comprise materials that are the same as, or are different from, the polymer in which the fibers are included.

Figure 2:
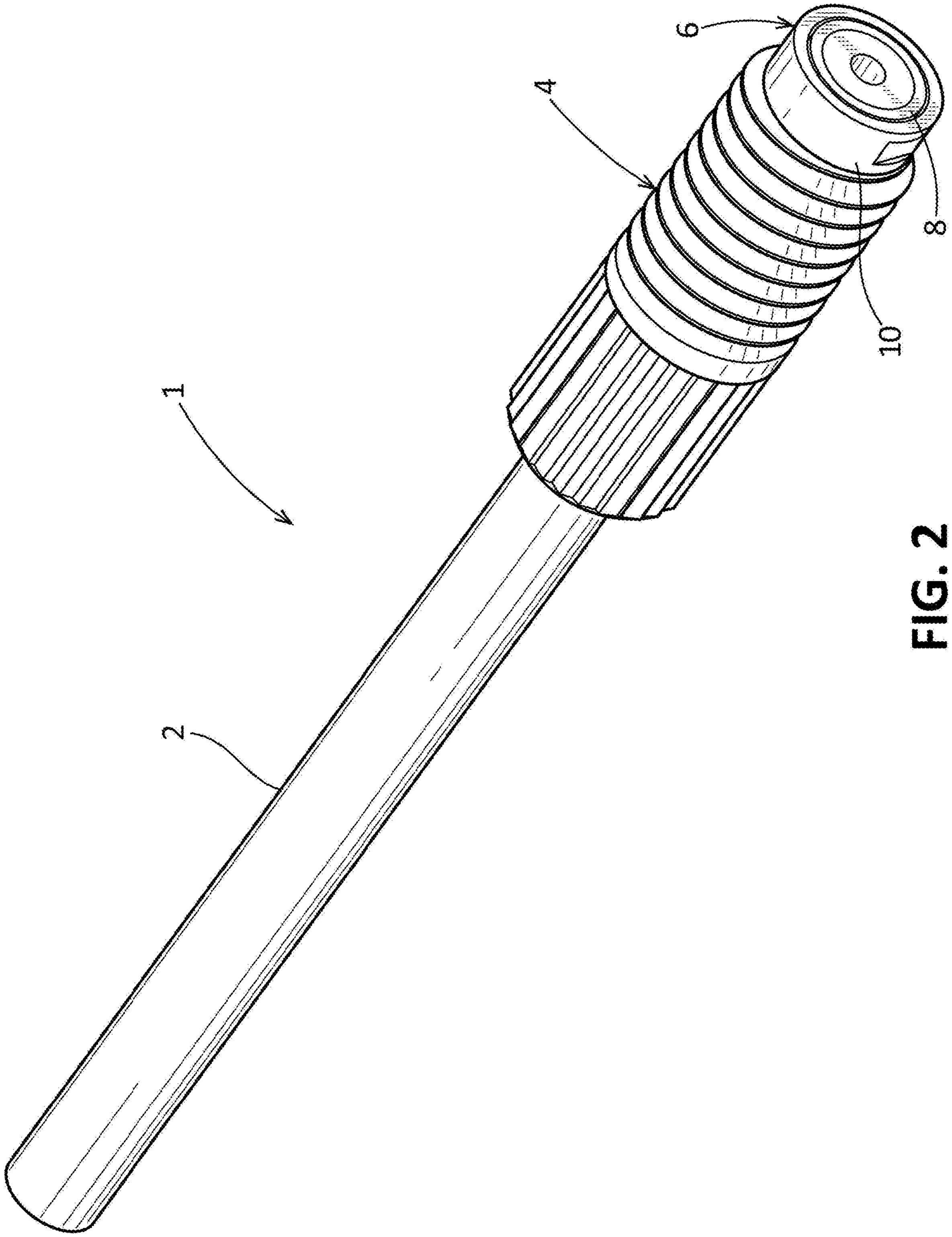
FIG. 2 is a perspective view of one embodiment of the fluidic connection system comprising a threaded fastener and a fitting assembly.
Figure 3:
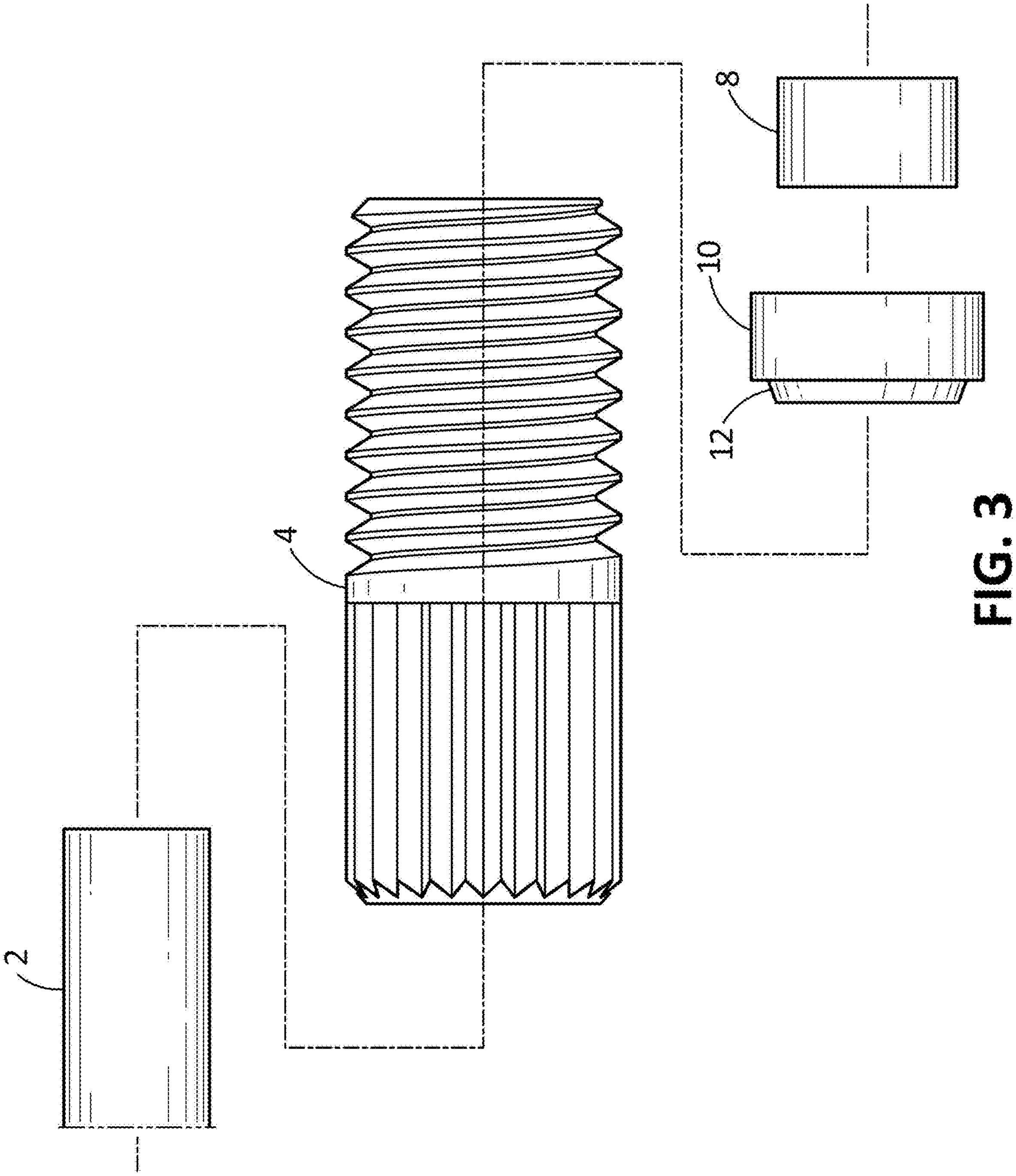
FIG. 3 is an exploded side view of a portion of the fluidic connection system of FIG. 2.
Figure 4:
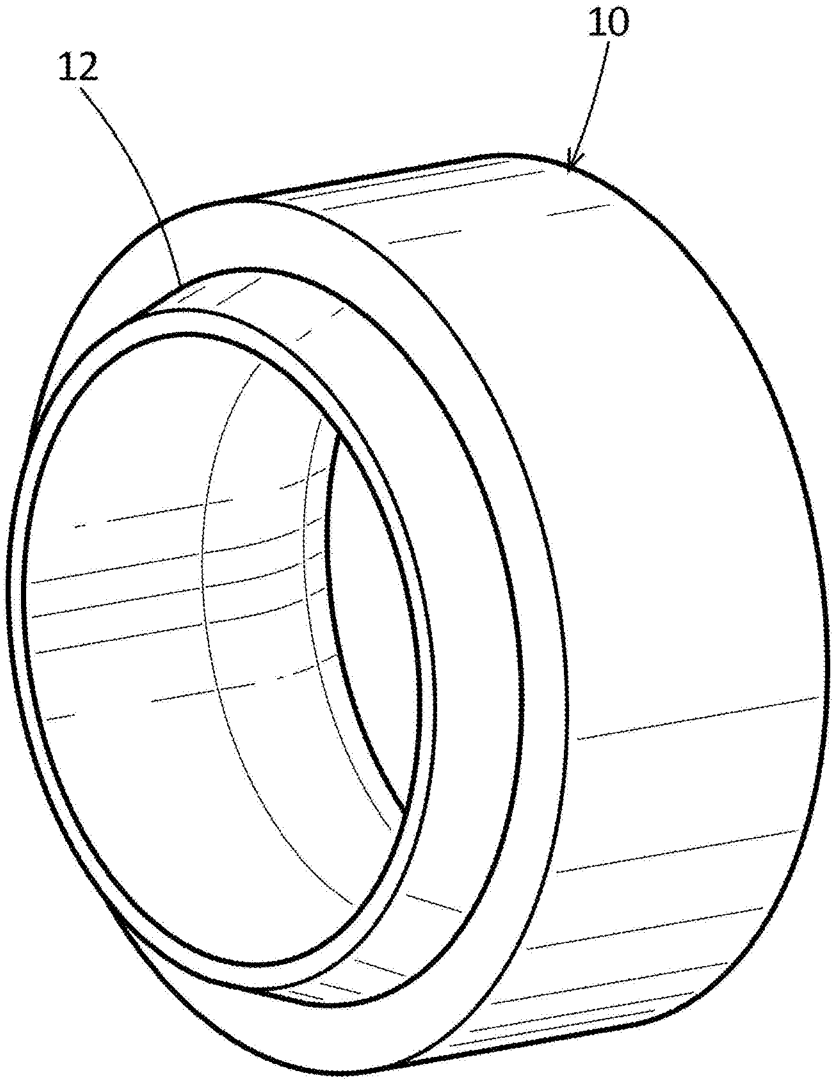
FIG. 4 is a perspective view of a locking ring of the fitting assembly of FIG. 2.
Figure 5:
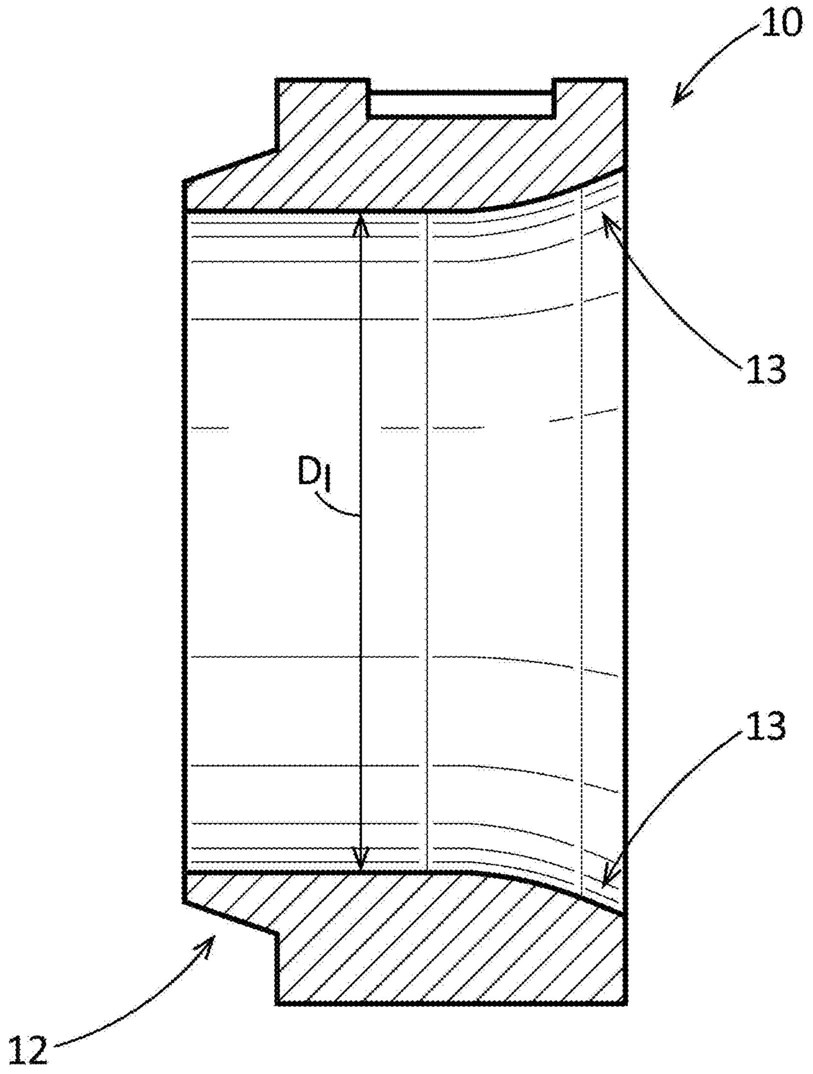
FIG. 5 is a cross-sectional view of the locking ring of FIG. 4.

Referring now to FIG. 2, a perspective view of an assembled fluidic connection system 1 is shown for a system utilizing a larger tubing (e.g. a tubing having an outer diameter of ⅛"). Fluidic connection system 1 includes a tubing 2 on which a threaded fastener 4 is positioned. The system 1 includes a fitting assembly 6. The fitting assembly 6 comprises a ferrule 8 and a locking ring 10. Assembly of the system is achieved by sliding the threaded fastener 4 onto the tubing 2 through an inner borehole of the threaded fastener, then the locking ring 10 (through an inner borehole in the locking ring) is positioned onto the tubing 2 and subsequently the ferrule 8 (through an inner borehole in the ferrule) is pressed onto the end of the tubing 2 within the opening in the locking ring 10 to result in the fluidic connection system 1 depicted in FIG. 2. An exploded view of the fluidic connection system 1 is provided in FIG. 3, depicting the tubing 2, the threaded fastener 4, the locking ring 10, and the ferrule 8. As shown in FIG. 3, the locking ring 10 includes a tapered feature 12 on a first side that acts as a centering feature for centering the fitting assembly 6 within the threaded fastener 4. FIG. 4 depicts a perspective view of the locking ring 10 with the tapered feature 12. A cross-sectional view of the locking ring 10 is provided in FIG. 5, further depicting the tapered feature 12 and also depicting the inner borehole or passageway defining an inner diameter $D_I$ of the locking ring 10. The inner diameter of the locking ring 10 at a first end or portion of the inner borehole has a first diameter D1. As shown in FIG. 5, the inner diameter of the locking ring 10 at a second end or portion of the locking ring 10, opposite the end defined by the tapered feature 12, has a second diameter D2. The diameter D2 is greater than the diameter D1, in other words the inner diameter of the locking ring 10 is greater at the end or portion of the locking ring 10 opposite the tapered feature 12. The second end or portion of the inner borehole of the locking ring 10 having the greater inner diameter D2 defines a flared opening 13. The end of the locking ring 10 with the flared opening 13 is sized and shaped to receive the ferrule 8. The flared opening 13 is larger at the outer edge of the opening to allow a user to more easily guide the ferrule 8 into the inner borehole. Although the tapered portion 12 is shown as frusto-conical in shape, and the flared portion of the borehole is shown as curved, it should be noted that the tapered portion 12 may be curved and may extend at various angles from the plane normal to the longitudinal axis of the locking ring 10, such as between 60 and 80 degrees, 45 and 85 degrees, and 30 and 85 degrees.

Figure 6:
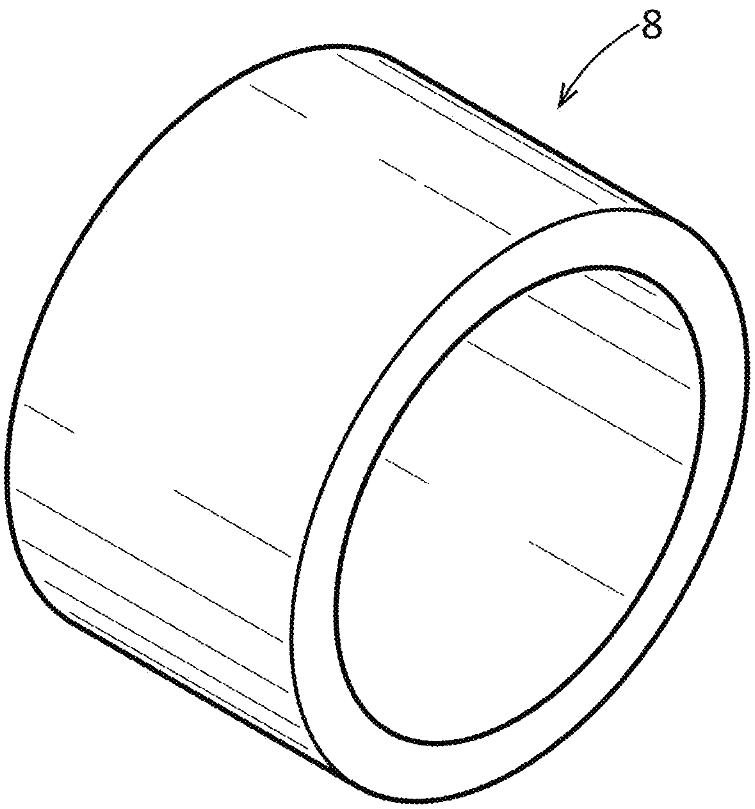
FIG. 6 is a perspective view of the ferrule of the fitting assembly of FIG. 2.

A perspective view of the ferrule 8 is provided in FIG. 6. As shown in FIG. 6, the ferrule 8 is generally cylindrical in shape with the inner borehole of the ferrule and may be symmetrical across a plane normal to its longitudinal axis (which may be the same longitudinal axis as that of the system such that it may be installed facing either direction on the tubing 2 for improving speed and ease of assembly and reducing mistakes during assembly.

Figure 7:
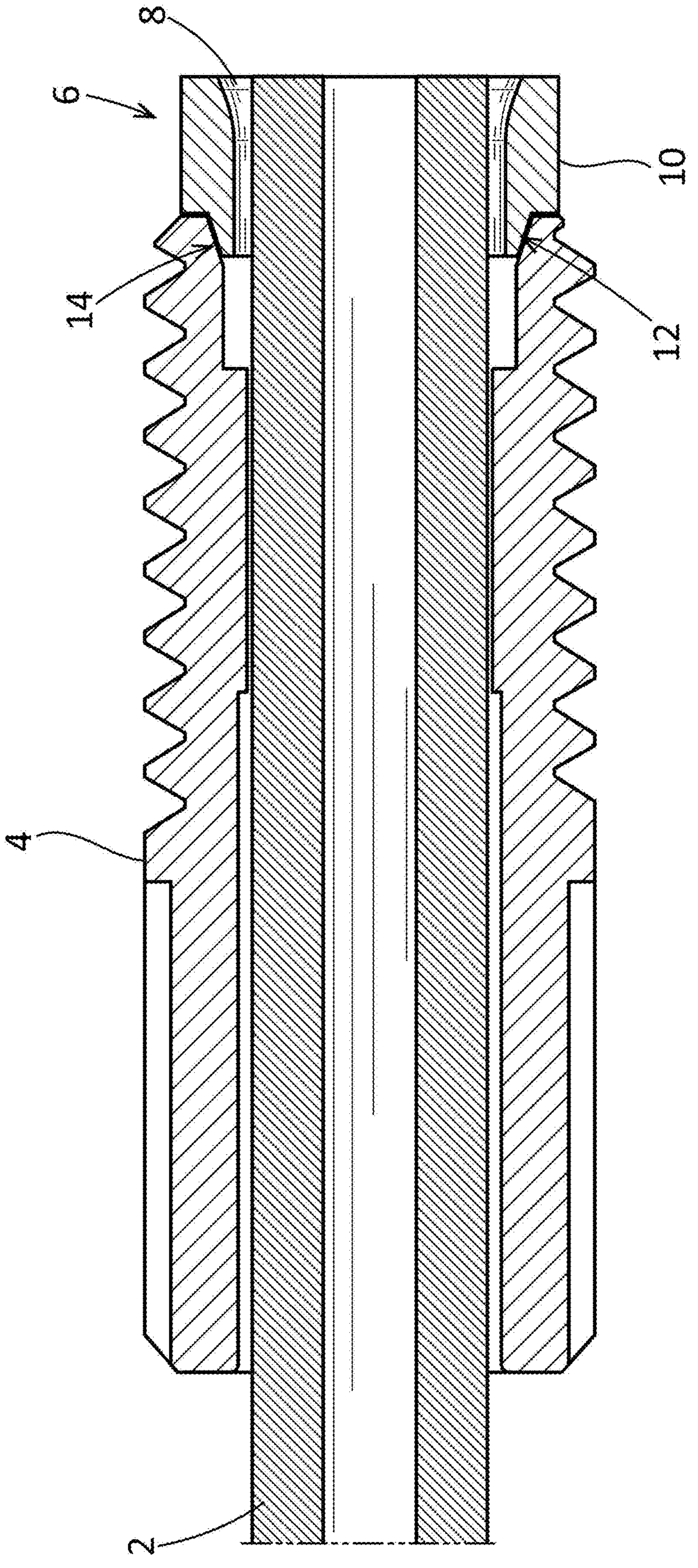
FIG. 7 is a cross-sectional view of the fluidic connection system of FIG. 2.

FIG. 7 depicts a cross-sectional side view of the assembled fluidic connection system 1. To properly center the fitting assembly 6 inside the threaded fastener 4, the threaded fastener 4 includes a tapered feature 14 at the edge of a fitting pocket 16. The tapered feature 14 is sized and shaped to interface with the tapered feature 12 of the locking ring. These interfacing tapered features are designed to slide where they interface such that the fitting assembly 6 and tubing 2 are not twisted as the fitting assembly 6 is torque into the mating port. Thus, as shown in FIG. 7, the tapered feature 14 of the threaded fastener 4 receives the tapered feature 12 of the fitting assembly 6 for properly centering the fitting assembly 6 within the threaded fastener 4. The opening in the threaded fastener 4 is large enough to receive even the largest of the applicable tubing.

Figure 8:
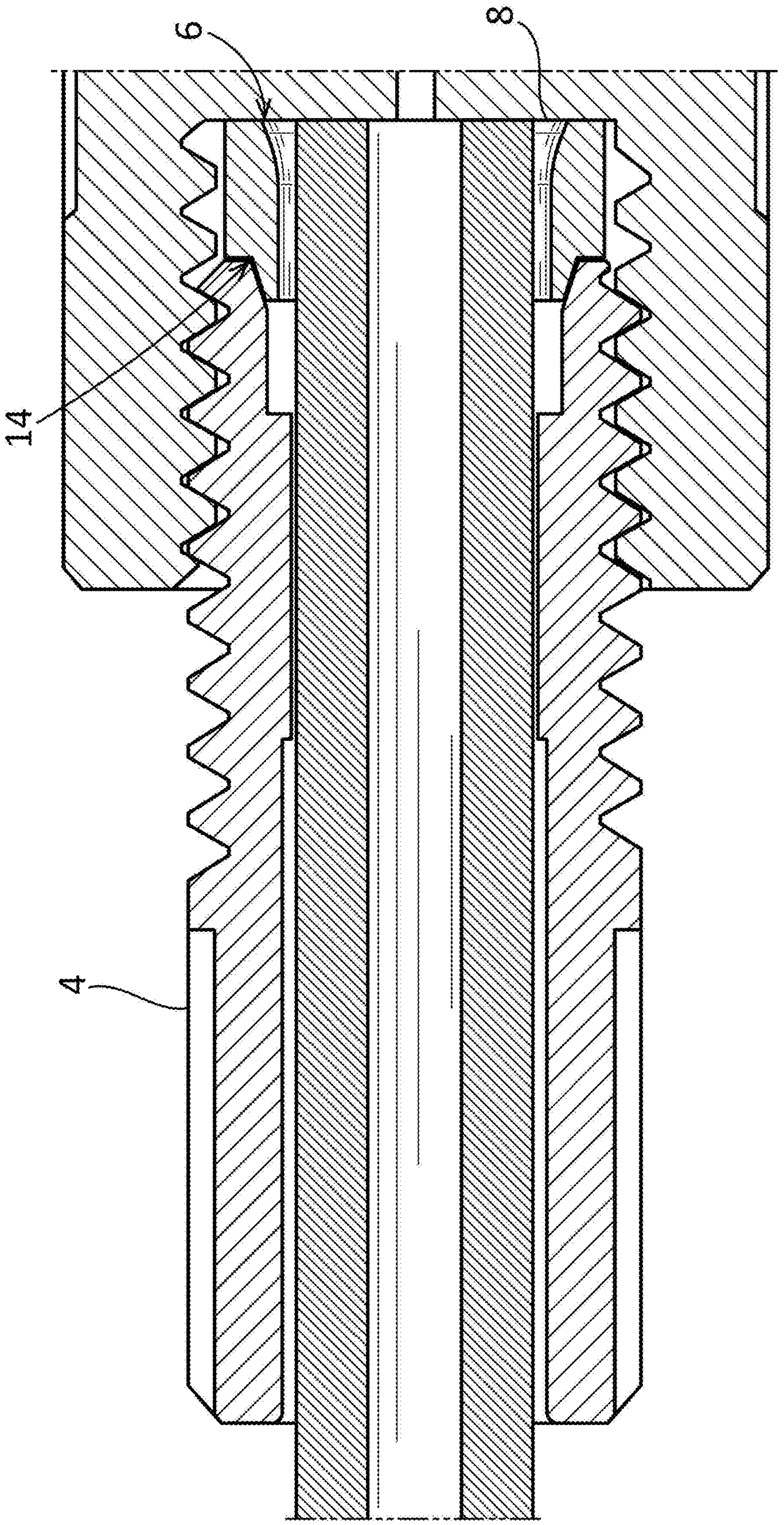
FIG. 8 is a cross-sectional sideview of the fluidic connection system of FIG. 1 coupled to a port.

FIG. 8 depicts a cross-sectional side view of the fluidic connection system 1 coupled to a threaded port 18. As shown in FIG. 8, the tapered feature 14 of the threaded fastener 4 is sized and shaped, in combination with the height of the fitting assembly 6, so that the optimal amount of the fitting assembly 6 protrudes from the tip threaded fastener 4. Too small a protrusion of the fitting assembly 6 may result in difficulty sealing due to limitations of forming threads all the way to the bottom of a port. While too large of a protrusion will not work for shallow ports due to limited threaded engagement. Thus, the universal system disclosed herein allows for large and small diameter tubing systems in deep and shallow threaded ports.

According to embodiments of the present disclose the ferrule 8 and the locking ring 10 may each comprise a biocompatible polymer, such as polyetheretherketone (PEEK). Other polymer materials which may be used for one or more of the ferrule 8 or locking ring 10 include, but are not limited to, TEFLON®, TEFZEL®, DELRIN®, perfluoroalkoxy (PFA, also called perfluoroalkoxyethylene), polytetrafluoroethylene (PTFE), ETFE (a polymer of tetrafluoroethylene and ethylene), polyetherimide (PEI), polyphenylene sulfide (PPS), polypropylene, sulfone polymers, polyolefins, polyimides, other polyaryletherketones, other fluoropolymers, polyoxymethylene (POM), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), or polychlorotrifluoroethylene (PCTFE), depending on the foregoing factors or perhaps others. In addition, PEEK (or other polymers) may be used that is reinforced or braided with carbon, carbon fibers, steel fibers, or the like. For example, in some embodiments the locking ring 10 may comprise a reinforced PEEK polymer for increasing the stiffness of the locking ring. Furthermore, in certain embodiments one or more components of the fitting assembly 6 may be coated with a material to increase strength, improve chemical resistance, improve temperature stability, or reduce permeability. Such coatings include, but are not limited to, metallization, polymeric coating, silicon-based coatings, and carbon-based coatings. Additionally, in certain embodiments one or more components of the fitting assembly 6 may be heat treated to improve properties such as crystallinity, chemical resistance, or permeability. In some embodiments the ferrule 8 may comprise an unfilled PEEK polymer and may be produced by injection molding or extruding a tube and then cutting the tube to the desired final length to form the ferrule 8.

Figure 9:
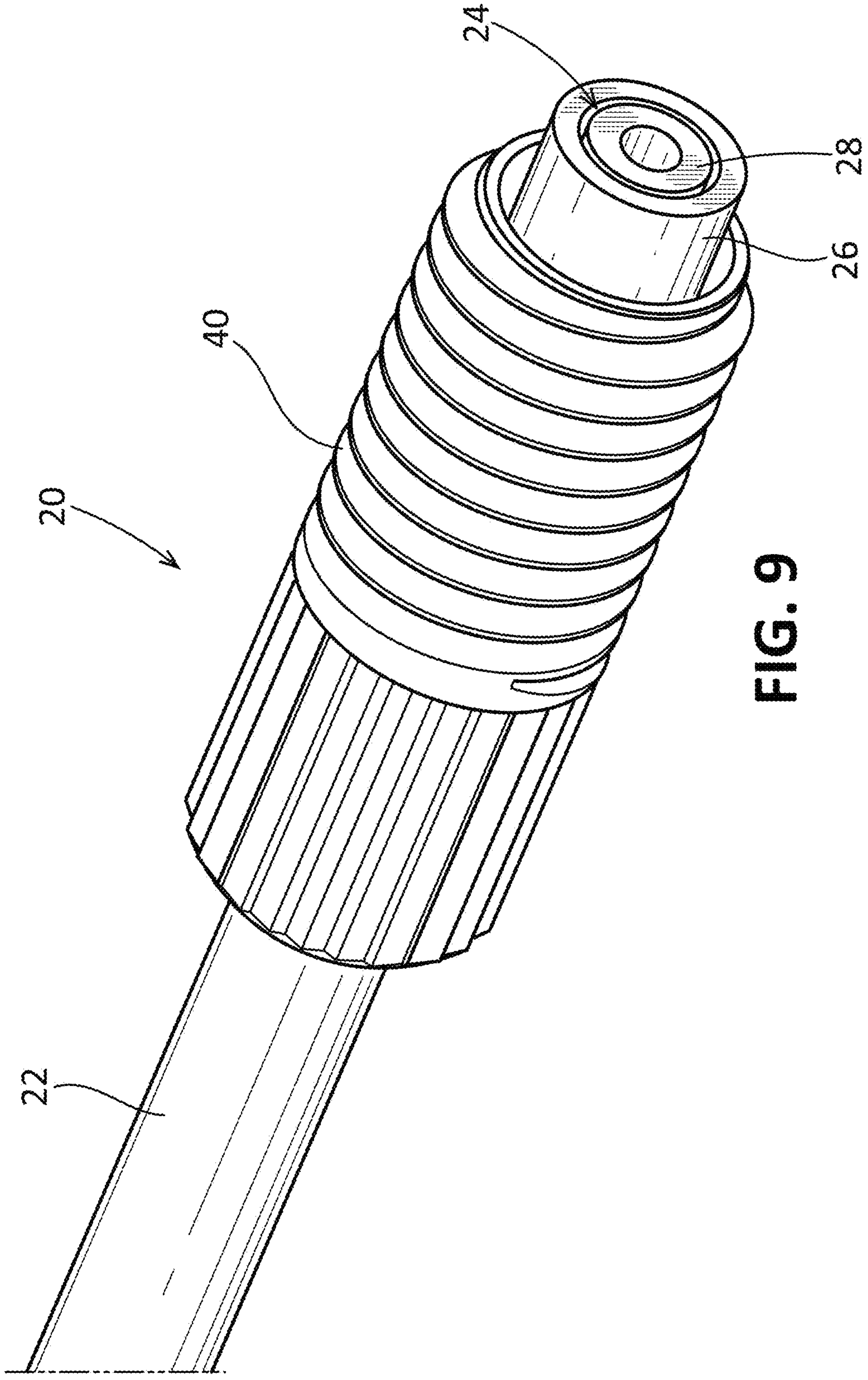
FIG. 9 is a perspective view of another embodiment of the fluidic connection system comprising a threaded fastener and a fitting assembly.
Figure 10:
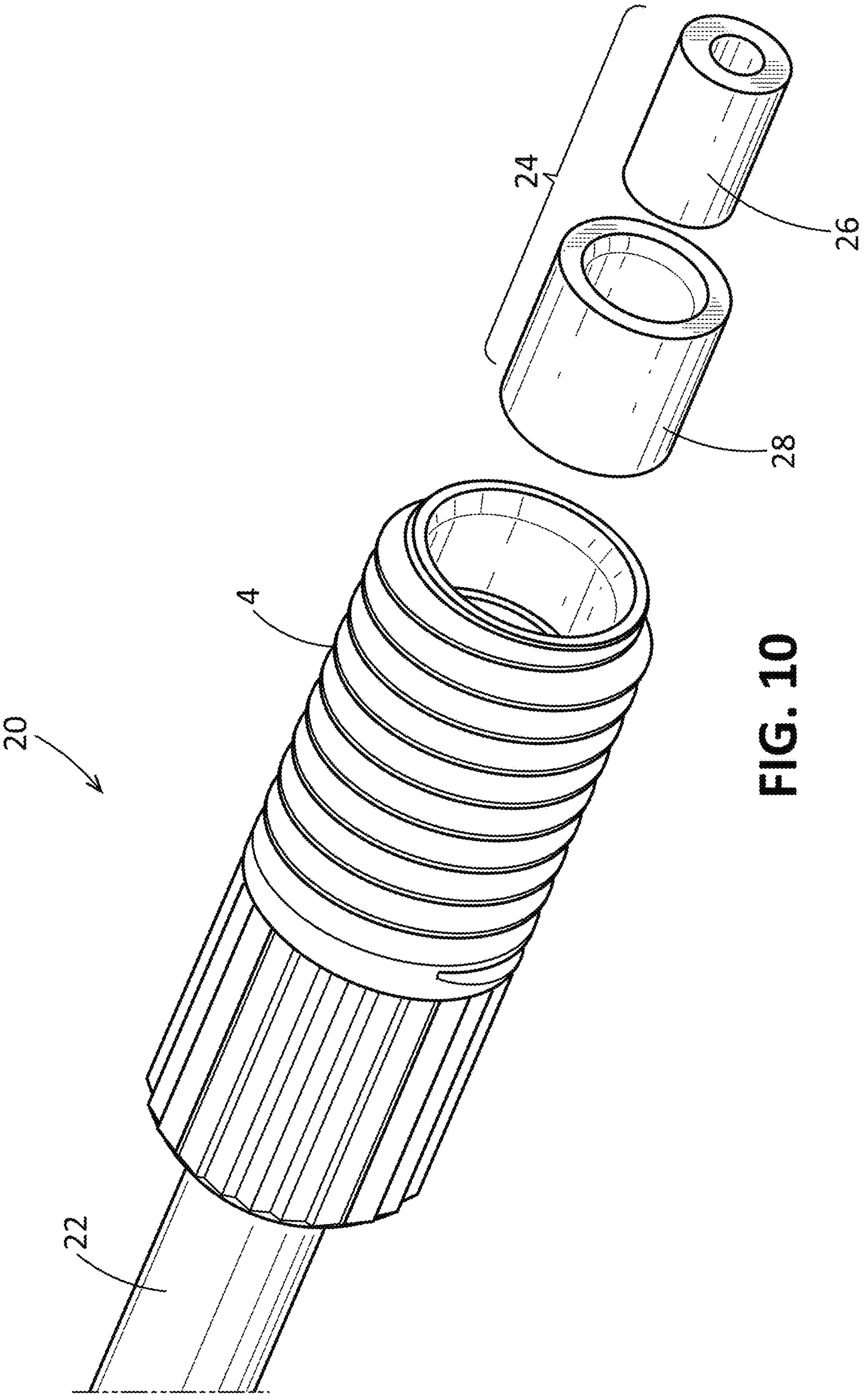
FIG. 10 is an exploded side view of a portion of the fluidic connection system of FIG. 9.

Referring now to FIG. 9, another embodiment of a fluidic connection system 20 according to aspects of the present disclosure is provided. The fluidic connection system 20 may include the same threaded fastener 4 as described with reference to FIGS. 2-8, along with a tubing 22 and a fitting assembly 24. The threaded fastener 4 is secured to the tubing 22 via the fitting assembly 24. The tubing 22 may have an outside diameter of 1/16". The fitting assembly 24 comprises a ferrule 26 and a locking ring 28. Assembly of the system 20 is achieved by sliding the threaded fastener 4 onto the tubing 22, then the locking ring 28 is positioned onto the tubing 22 and subsequently the ferrule 26 is pressed onto the end of the tubing 22 within the opening of the locking ring 28 to result in the fluidic connection system 20 depicted in FIG. 9. An exploded view of the fluidic connection system 20 is provided in FIG. 10, depicting the tubing 22, the threaded fastener 4, the locking ring 28, and the ferrule 26. Depending upon the intended application (e.g., pressures, temperatures, solvents used, etc.), the same or different materials may be used for the fastener 4 and/or the tubing 2.

Figure 11:
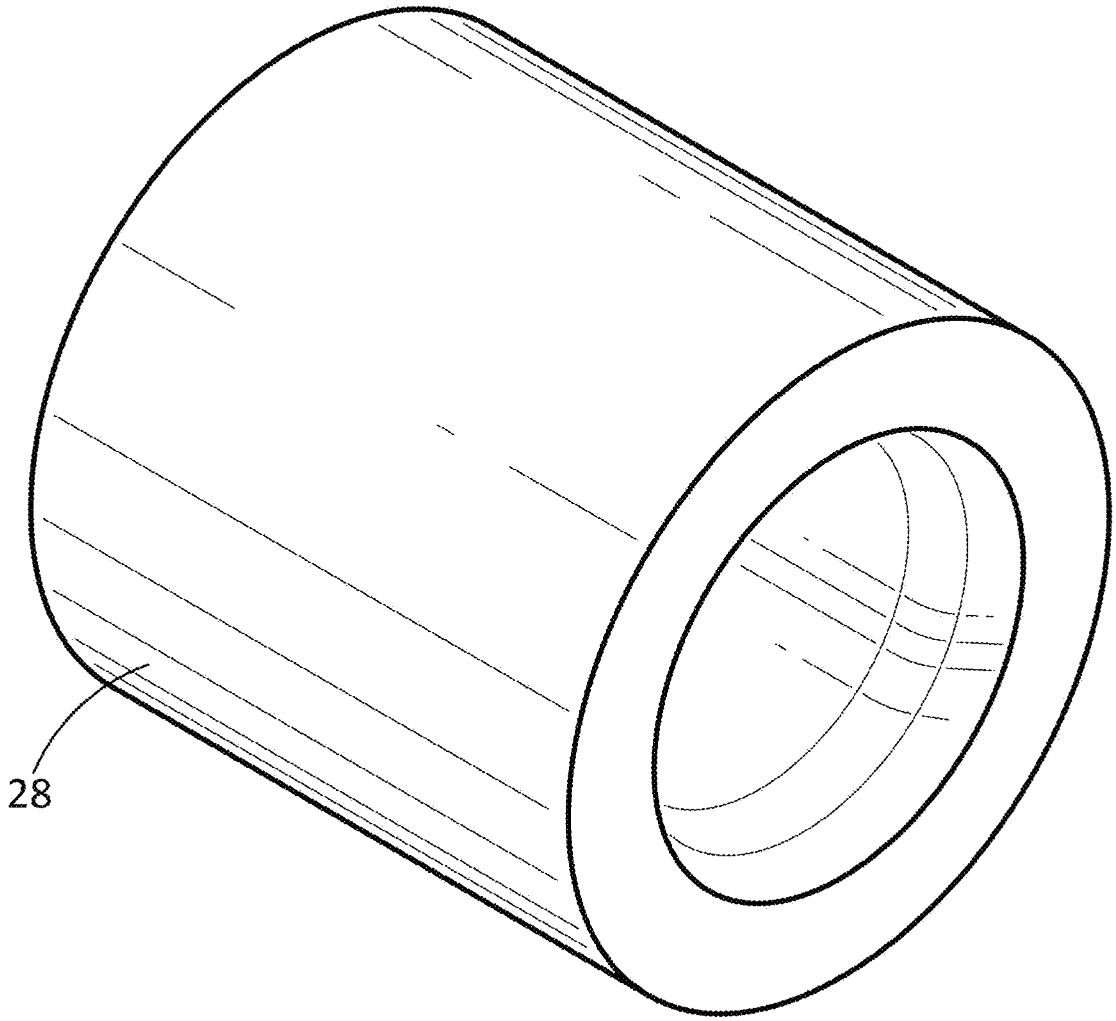
FIG. 11 is a perspective view of the locking ring of the fitting assembly of FIG. 9.
Figure 12:
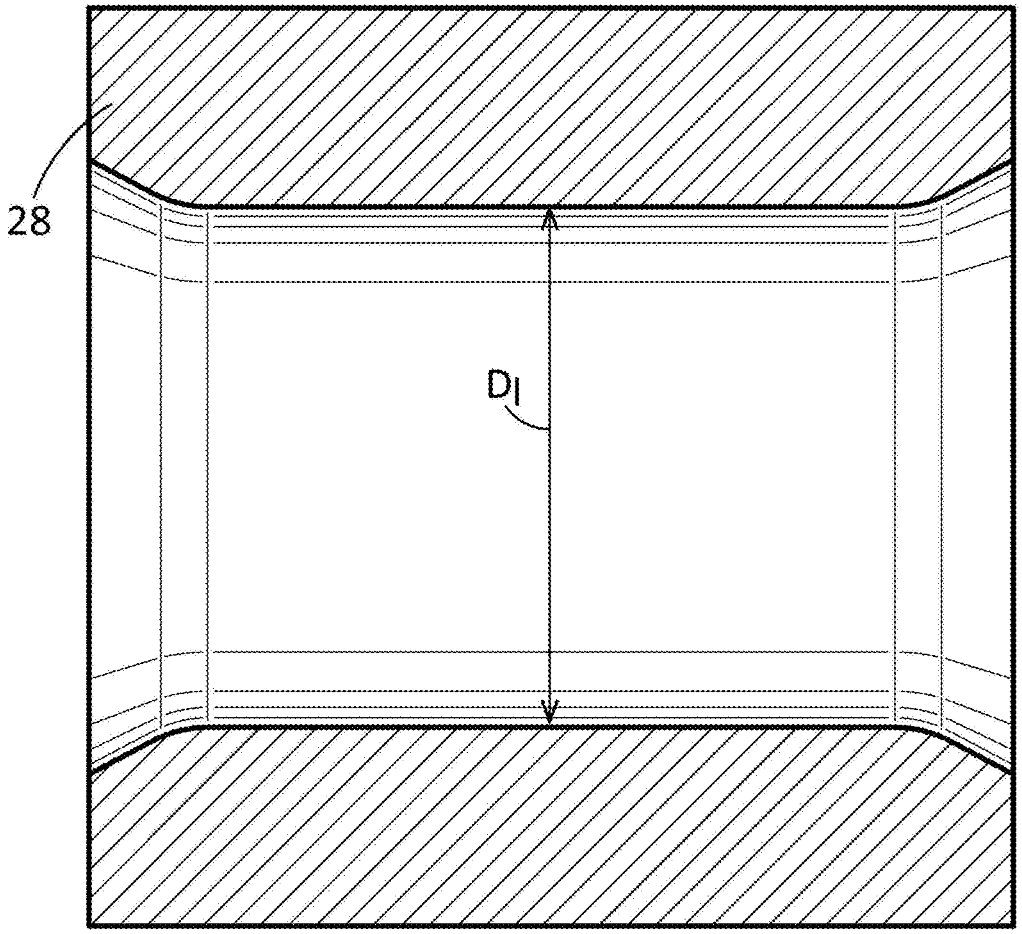
FIG. 12 is a cross-sectional view of the locking ring of FIG. 11.
Figure 13:
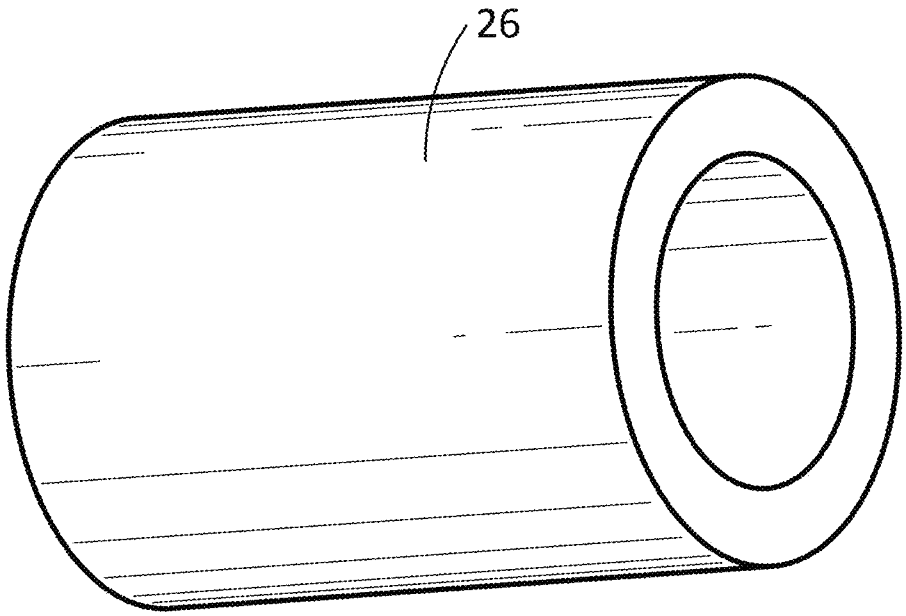
FIG. 13 is a perspective view of the ferrule of the fitting assembly of FIG. 9.

As shown in FIG. 10, the locking ring 28 is generally cylindrical in shape and is symmetrical such that it may be positioned on the tubing 22 in either direction, making for easier and faster assembly with less error. FIG. 11 depicts a perspective view of the locking ring 28. As shown in FIG. 11, the locking ring 28 is symmetric such that it may be assembled on the tubing 22 in either direction making for easier and faster assembly with less error. In other words, the inner diameter (show as $D_I$ in FIG. 12) of the locking ring 28 is constant in the central region and has symmetric flared portions at each end region of the locking ring 28. FIG. 12 depicts a cross-sectional side view of the locking ring 28 about a longitudinal axis of the locking ring 28. As shown in FIG. 12, the inner diameter $D_I$ of the locking ring 28 is larger on the ends with the inner diameter $D_I$ of the locking ring 28 being constant in the central area, making the locking ring 28 symmetrical such that it may be assembled onto the tubing 22 in either direction while have the same clamping effect. Similarly, the ferrule 26, shown in perspective view in FIG. 13 is likewise symmetrical such that it can be assembled onto the tubing 22 in either direction with the same result. By permitting one or both of the locking ring 28 and the ferrule 26 to be assembled onto the tubing 22 in either direction, assembly time and errors made during assembly of the fluidic connection system 20 are reduced.

Figure 14:
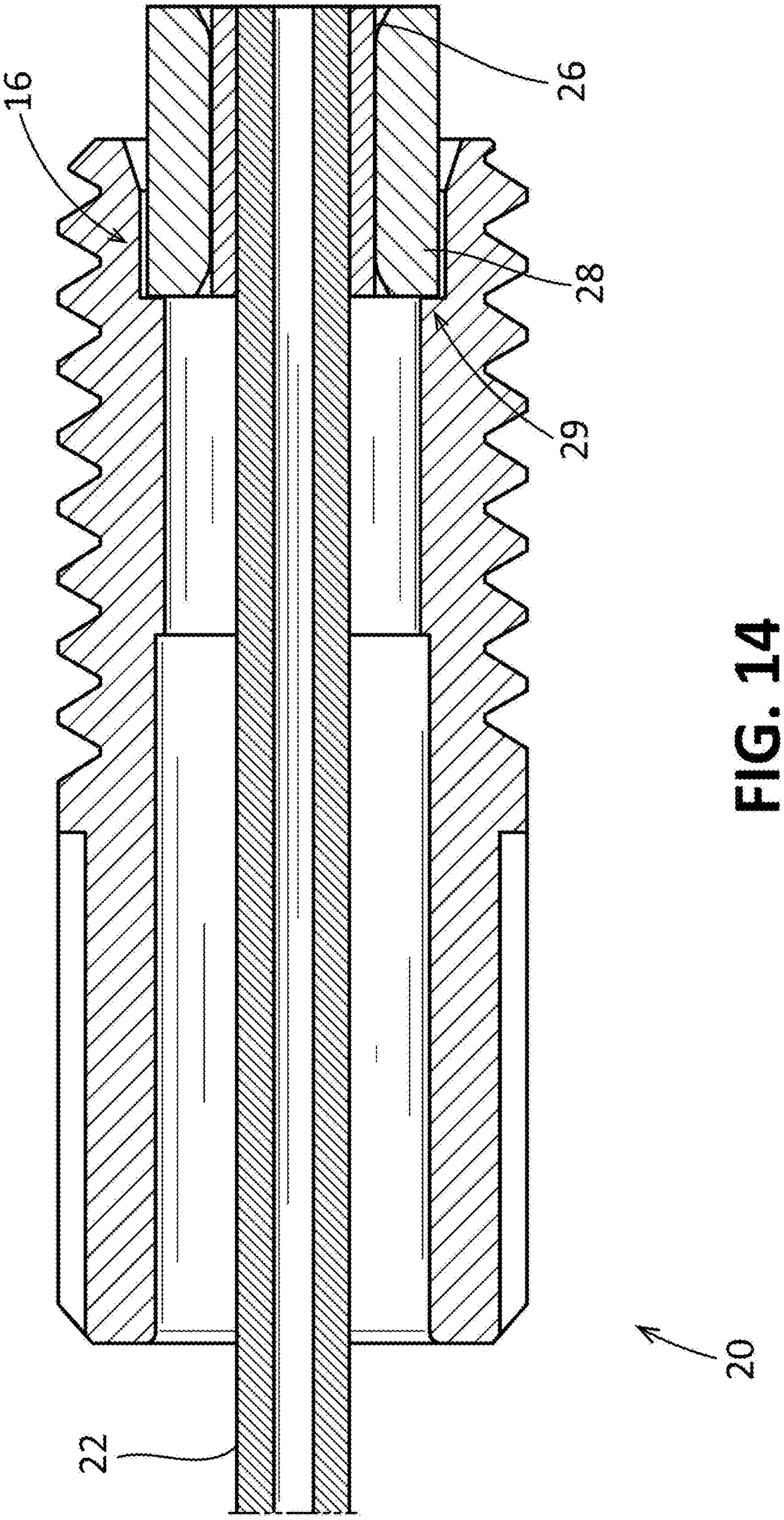
FIG. 14 is a cross-sectional view of the fluidic connection system of FIG. 9.

FIG. 14 depicts a cross-sectional side view of the assembled fluidic connection system 20. The fitting pocket 16 of the threaded fastener 4 is sized and shaped to receive the assembled fitting assembly 24 comprising the ferrule 26 and the locking ring 28. The fitting pocket 16 aids in centering the assembled fitting assembly 24 by interfacing the walls defining the fitting pocket 16 with the outer surface of the locking ring 28 and preventing the locking ring 28 from extending beyond the end wall 29 that defines the fitting pocket 16.

Figure 15:
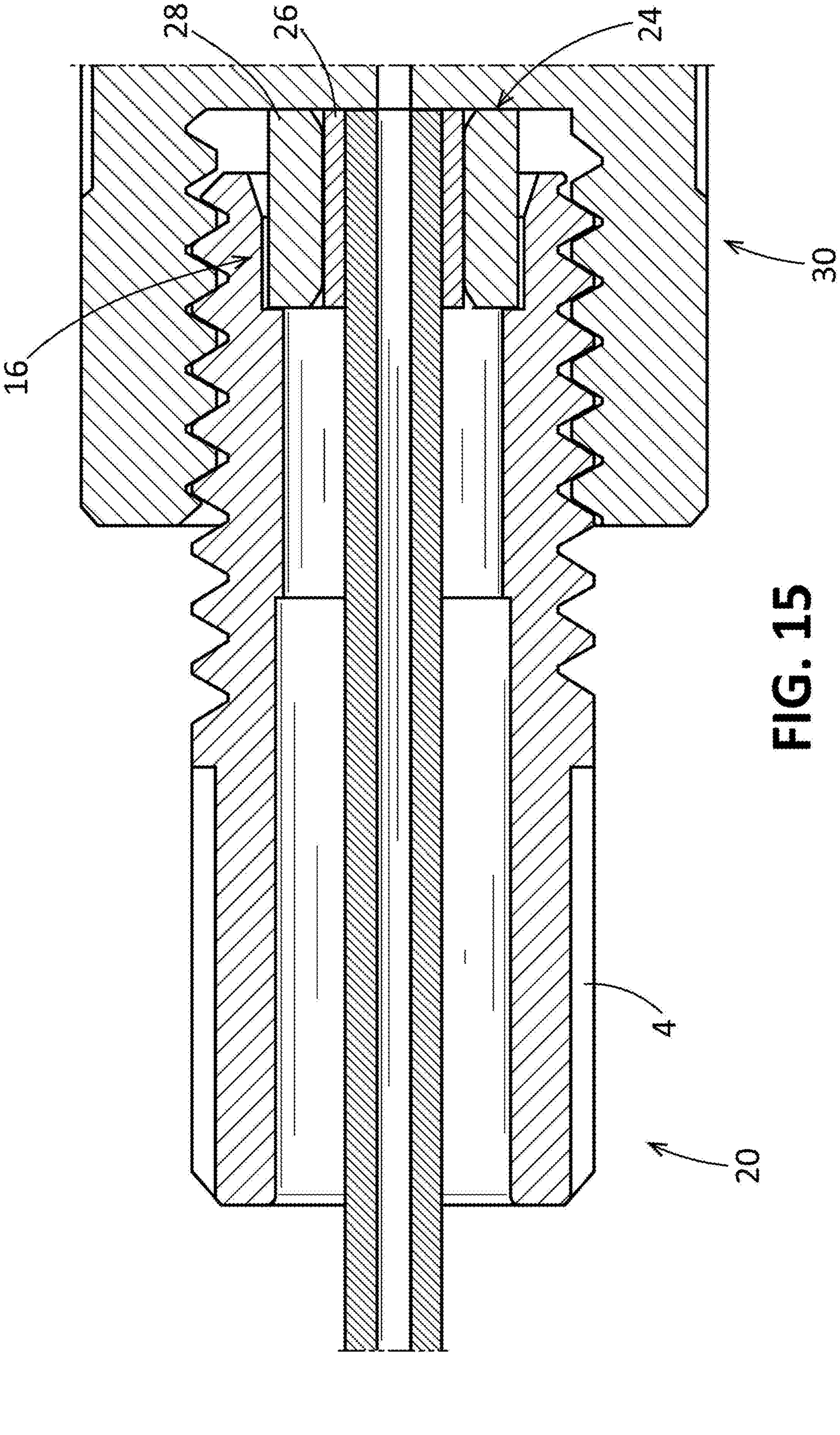
FIG. 15 is a cross-sectional side view of the fluidic connection system of FIG. 9 coupled to a port.

FIG. 15 depicts a cross-sectional side view of the fluidic connection system 20 coupled to a threaded port 30. As shown in FIG. 15, the fitting pocket 16 of the threaded fastener 4 is sized and shaped, in combination with the height of the fitting assembly 24, so that the optimal amount of the ferrule 26 protrudes from the tip of the fitting assembly 24. Too small a protrusion from the tip of the fitting assembly 24 may result in difficulty sealing due to limitations of forming threads all the way to the bottom of a port, while too large of a protrusion will not work for shallow ports due to limited threaded engagement. Thus, the universal fluidic connection system disclosed herein allows for large and small diameter tubing systems in deep and shallow threaded ports. In addition, the opening in the threaded fastener 4 is large enough to receive even the largest of the applicable tubing, such an exemplary embodiment of a fluidic connection system according to aspects of the present disclosure as shown and described with reference to FIGS. 2-8. Moreover, the interface between the ferrule 26 and the locking ring 28 is optimized to reduce installation force and material creep while maintaining a metal free system.

According to embodiments of the present disclose the ferrule 26 and the locking ring 28 of the fitting assembly 24 may each comprise a biocompatible polymer, such as polyetheretherketone (PEEK). Other polymer materials which may be used for one or more of the ferrule 26 or locking ring 28 include, but are not limited to, TEFLON®, TEFZEL®, DELRIN®, perfluoroalkoxy (PFA, also called perfluoroalkoxyethylene), polytetrafluoroethylene (PTFE), ETFE (a polymer of tetrafluoroethylene and ethylene), polyetherimide (PEI), polyphenylene sulfide (PPS), polypropylene, sulfone polymers, polyolefins, polyimides, other polyaryletherketones, other fluoropolymers, polyoxymethylene (POM), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), or polychlorotrifluoroethylene (PCTFE), and others, depending on the foregoing factors or perhaps others. In addition, PEEK (or other polymers) may be used that is reinforced or braided with carbon, carbon fibers, steel fibers, or the like. For example, in some embodiments the locking ring 10 may comprise a reinforced PEEK polymer for increasing the stiffness of the locking ring. Furthermore, in certain embodiments one or more components of the fitting assembly 24 may be coated with a material to increase strength, improve chemical resistance, improve temperature stability, or reduce permeability. Such coatings include, but are not limited to, metallization, polymeric coating, silicon-based coatings, and carbon-based coatings. Additionally, in certain embodiments one or more components of the fitting assembly 24 may be heat treated to improve properties such as crystallinity, chemical resistance, or permeability. In some embodiments the ferrule 8 may comprise an unfilled PEEK polymer and may be produced by injection molding or extruding a tube and then cutting the tube to the desired final length. Depending upon the intended application (e.g., pressures, temperatures, solvents used, etc.), the same or different materials may be used for the fastener 4 and/or the tubing 22.

It will be appreciated that, as noted below, the tubing, and also the components of a fitting assembly or connection system, used in many analytical instrument systems for fluidic connections can be very small. Moreover, the components used in many analytical instrument systems can vary, and often need to be changed or replaced, such as replacing columns, pumps, injection valves, and so forth, whether when switching from one particular application of the system for one type of analysis to another or substantially re-organizing the system and its components. Given the small size of the tubing and fitting assembly or fluidic connection components, such as nuts, ferrules, sleeves, transfer tubing, tips, and so forth, especially together with the complexity of many analytical instrument systems, many operators often spend additional time and effort locating the tubing for a connection or locating an fitting assembly, sometimes in very awkward or difficult to reach locations with many connections in a tight space.

The current disclosure thus provides a threaded fastener and a fitting assembly which can be used for making one or more connections in any system that utilizes a face seal (such as a flat-bottomed port) and can withstand the fluid pressures required for instrument applications. It is to be noted that the fitting and tubing assembly configurations described and shown in this disclosure focus on only one end of the tubing and fitting assembly, but the present disclosure may be used in embodiments as a complete fluidic connection between two components, for providing a fluidic connection between any two points in an analytical instrument system or other system.

The tubing and fitting assemblies shown and disclosed herein will successfully handle fluidic connections in systems in which volumes of a fluid at low pressures are needed. For example, the tubing in accordance with the present disclosure may have an outer diameter (OD) in the range of from about 1/64 inches to about 1/4 inch, or about 1/64, 1/32, 1/16, 1/8 or 1/4 of an inch in diameter inclusive, and may have an inner diameter of from about 0.001 to about 0.096 inches, or about 0.001, 0.002, 0.006, 0.010, 0.015, 0.020, 0.025, 0.030, 0.060, 0.085, or 0.095 inches, inclusive. Moreover, the assembly described and shown in this disclosure is capable of pressures of up to approximately 500 PSI at finger-tight torque values of 1 in*lbs, for example. The assemblies are also flexible and capable of multiple connection uses prior to failure. It is believed that the fitting assembly of the present disclosure is able to translate rotational torque directly to axial force to generate the seal with a flat-bottom port. Using such a torque load to make a test connection with a fitting assembly in accordance with the present disclosure, we were able to obtain a sealed fluid connection that maintained a seal at fluid pressures of up to 500 psi before a burst or a leak.

While the present invention has been shown and described in various embodiments, those skilled in the art will appreciate from the drawings and the foregoing discussion that various changes, modifications, and variations may be made without departing from the spirit and scope of the invention as set forth in the claims. For example, the shapes, sizes, features, and materials of the fitting assembly, fluid connection, and/or analytical instrument systems of the present disclosure may be changed. Hence, the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

We claim:

1. A fluidic connection system comprising:

a locking ring having a first inner diameter at a first end and a second end, wherein a second inner diameter in a central region of the locking ring is smaller than the first inner diameter;

a ferrule sized and shaped to be positioned within the first inner diameter of the locking ring; and a threaded fastener having a passageway sized and shaped to removably receive a tubing therein, the threaded fastener also having (i) an internal tapered portion at a first end of the threaded fastener and (ii) a seat portion sized and shaped to removably receive the locking ring within the first end of the threaded fastener, wherein the ferrule is symmetrical across a plane normal to its longitudinal axis such that it may be positioned on the tubing in either direction.

2. The fluidic connection system according to claim 1, wherein the locking ring is symmetrical across a plane normal to its longitudinal axis such that it may be positioned on the tubing in either direction.

3. The fluidic connection system according to claim 1, wherein said locking ring and said ferrule each comprise a biocompatible material.

4. The fluidic connection system according to claim 1, wherein the tubing has an outer diameter of 1/16".

5. The fluidic connection system according to claim 1, wherein at least one of said locking ring and said ferrule comprises at least one of the following: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), or polychlorotrifluoroethylene (PCTFE).

6. The fluidic connection system according to claim 5, wherein the locking ring comprises PEEK.

7. The fluidic connection system according to claim 6, wherein the locking ring comprises reinforced PEEK.

8. The fluidic connection system according to claim 1, wherein each of the locking ring and the ferrule have an end that defines a face adapted to provide a seal against the bottom of a flat-bottomed port.

9. The fluidic connection system according to claim 8, wherein the seal is sufficient to withstand fluidic pressures between 0 and 200 psi.

10. The fluidic connection system according to claim 1, wherein a portion of the first end of the locking ring and an end of the ferrule extend beyond first end of the threaded fastener when assembled.

11. A biocompatible fluidic connection system comprising:

a locking ring having (i) a first inner diameter at a first end, (ii) a second inner diameter at a second end that is smaller than the first inner diameter, and (iii) a tapered portion at the second end;

a ferrule sized and shaped to be positioned within the first inner diameter of the locking ring; and a threaded fastener having a passageway sized and shaped to removably receive a tubing therein, the threaded fastener also having a tapered portion at a first end of the threaded fastener sized and shaped to mate with the tapered portion of the locking ring, wherein the ferrule is symmetrical about a longitudinal axis such that it may be positioned on the tubing in either direction.

12. The fluidic connection system according to claim 11, wherein said locking ring and said ferrule each comprise a biocompatible material.

13. The fluidic connection system according to claim 11, wherein the tubing has an outer diameter of 1/8".

14. The fluidic connection system according to claim 11, wherein at least one of said locking ring and said ferrule comprises at least one of the following: PEEK, PAEK, PEKK, FEP, ETFE, PTFE, PFA, or PCTFE.

15. The fluidic connection system according to claim 14, wherein the locking ring comprises PEEK.

16. The fluidic connection system according to claim 15, wherein the locking ring comprises reinforced PEEK.

17. The fluidic connection system according to claim 11, wherein each of the locking ring and the ferrule have an end that is a substantially flat face adapted to provide a seal when pressed against the bottom of a flat-bottomed port.

18. The fluidic connection system according to claim 17, wherein the seal is sufficient to withstand fluidic pressures of between 0 and 200 psi.

19. The fluidic connection system according to claim 11, wherein a portion of the first end of the locking ring and an end of the ferrule extend beyond the first end of the threaded fastener when assembled.

* * * * *